(12) United States Patent
Frye et al.

(10) Patent No.: US 6,832,372 B1
(45) Date of Patent: Dec. 14, 2004

(54) UPDATING SYSTEM ROM CONFIGURATION UTILITY USING NVRAM

(75) Inventors: James F. Frye, Houston, TX (US);
Darren J. Cepulis, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 368 days.

(21) Appl. No.: 09/675,529

(22) Filed: Sep. 29, 2000

(51) Int. Cl.[7] .......................... G06F 9/445; G06F 9/00; G06F 9/25

(52) U.S. Cl. .......................... 717/168; 717/174; 713/1; 713/2; 713/100

(58) Field of Search .............................. 713/100, 1, 2; 719/327; 717/169, 168, 174, 175; 710/8, 10

(56) References Cited

U.S. PATENT DOCUMENTS

| | | | |
|---|---|---|---|
| 5,390,324 A | 2/1995 | Burckhartt et al. | 395/575 |
| 5,596,711 A | 1/1997 | Burckhartt et al. | 395/182.21 |
| 5,630,076 A * | 5/1997 | Saulpaugh et al. | 713/1 |
| 5,956,475 A | 9/1999 | Burckhartt et al. | 395/182.21 |
| 6,058,455 A * | 5/2000 | Islam et al. | 711/114 |
| 6,282,670 B1 * | 8/2001 | Rezaul Islam et al. | 714/6 |
| 6,336,161 B1 * | 1/2002 | Watts | 711/103 |
| 6,560,699 B1 * | 5/2003 | Konkle | 713/1 |

OTHER PUBLICATIONS

"BIOS Boot SPecification," 1995, Compaq Computer Corp., Phoenix Technologies Ltd., and Intel Corp., Version 1.00, pp. 1–42.*

"Extended System Configuration Data Specification," 1994, Compaq Computer Corp., Phoenix Technologies Ltd., and Intel Corp., Version 1.02A, pp. 1–34.*

"Plug and Play BIOS Specification," 1994, Compaq Computer Corp., Phoenix Technologies Ltd., and Intel Corp., Version 1.0A, pp. 1–56.*

"Plug and Play ISA Specification," 1994, Compaq Computer Corp., Phoenix Technologies Ltd., and Intel Corp., Version 1.0A, pp. 1–65.*

* cited by examiner

*Primary Examiner*—Tuan Dam
*Assistant Examiner*—Eric B. Kiss

(57) ABSTRACT

A computer system having central processing unit, a ROM, and an NVRAM. A table is stored in the ROM. The information relates to configuration data for boards installed in the computer. Each entry in the ROM table includes a board identifier and corresponding text describing the board and/or board configuration data. An extension table is stored in the NVRAM which provides storage capacity for the same type of information in the ROM-based table. The NVRAM-based extension table also includes storage for board identifiers and corresponding configuration information. A utility checks the ROM-based board table to determine whether a matching entry is found for each board in the system. If a match is found, the corresponding configuration information is used to configure the system for the board. If no match is found, the program checks the extension table for a matching entry and uses a default setting.

12 Claims, 2 Drawing Sheets

UPDATING SYSTEM ROM CONFIGURATION UTILITY USING NVRAM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to updating system read only memory ("ROM") configuration information. More particularly, the invention relates to updating system ROM configuration information using non-volatile random access memory.

2. Background of the Invention

It is, or is becoming, commonplace for system configuration information for a computer to be stored in a read only memory ("ROM"). Most, of not all, computers have at least one ROM device. At least one of the ROM devices is commonly referred to as the "system ROM" or "BIOS ROM." "BIOS" refers to the Basic Input/Output System. BIOS comprises executable code that permits control over various low level functions in the computer such as access to a floppy disk and other types of storage devices. The BIOS firmware is stored in the system ROM. During boot-up, the computer's CPU typically copies the BIOS firmware to main system memory. Subsequent uses of BIOS are made from the copy stored in main system memory.

Many computers also store configuration information on the system ROM. Such configuration information may include information regarding the various types of option boards the computer supports. The option board information generally includes a board identifier ("ID") and corresponding information the computer needs to be compatible with the board. For example, the information may include interrupt settings, port input/output ("I/O") values, etc.

Although a generally acceptable way to provide board configuration information, a ROM-based configuration technique has a significant downside. The downside is that whenever a new board is developed by the computer manufacturer or a third party, the system ROM must be re-flashed. Re-flashing a ROM generally requires taking the computer off-line, erasing the ROM and writing the entire ROM device with the old information just erased and with the new information, and retesting the system. Rewriting the entire ROM device is typically required even though only a portion of the information requires updating. Flashing a ROM is generally time consuming and, particularly in the context of a company or other entity operating dozens, hundreds or even thousands of servers, inconvenient. Once a ROM is re-flashed, the system is typically re-tested and the new ROM firmware validated to ensure the new firmware functions acceptably. The retesting and validation process can take hours, days or even a week or more, particularly for large companies having sophisticated computer systems and software.

Accordingly, a technique or mechanism is needed that can permit system configuration information, such as board information, to be updated without having to re-flash the system ROM. Such a system would avoid the need of having to test system since a new ROM firmware image would not be loaded. Despite the advantages such a system would provide, to date no such system is known to exist.

BRIEF SUMMARY OF THE INVENTION

The problems noted above are solved in large part by a computer system having central processing unit, a read only memory ("ROM"), a nonvolatile random access memory ("NVRAM"), and other common computer components. A table of information is stored in the ROM. The information can relate to configuration data for boards installed in the computer or other types of information. Preferably, each entry in the ROM table includes a board identifier and corresponding text describing the board and/or configuration data for the board (e.g., interrupt settings, port I/O settings, etc.). An extension table is stored in the NVRAM which provides storage capacity for the same type of information in the ROM-based table. The NVRAM-based extension table preferably also includes storage for board identifiers and corresponding configuration information.

When running a setup utility program, the utility preferably first checks the ROM-based board table to determine whether a matching entry is found for each board in the system. If a match is found, the corresponding configuration information is used to configure the system for use of the board. If a match is not found, the utility program then checks the NVRAM extension table for a matching entry. If a match is found, the corresponding configuration information is used. If no match is found in either table, a default setting is used.

This system permits new board entries to be written to the NVRAM memory table rather than flashing a new ROM. If, however, the user desires to flash a new ROM with a new firmware image, the system preferably checks the entries in the NVRAM extension table for duplicates as compared to the new ROM firmware image. Any duplicates preferably are deleted from the NVRAM table to maximize its available capacity.

Because the new configuration information is added to the NVRAM, rather than the ROM being re-flashed in its entirety, the computer system need not be retested and the ROM firmware validated, a process which, as noted above, can be very time consuming. These and other benefits will become apparent upon reviewing the following disclosure.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
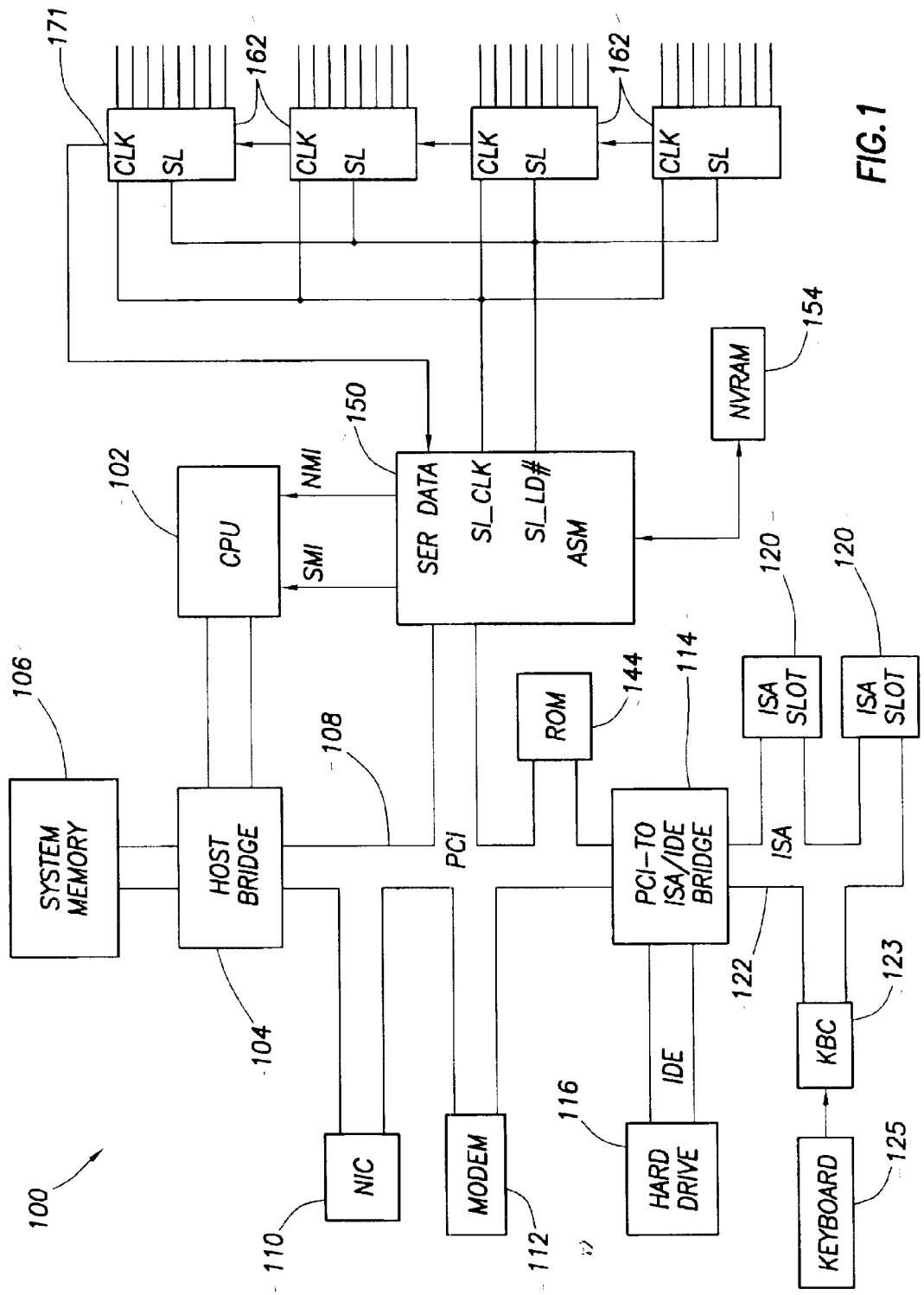
FIG. 1 shows a block of a computer system in accordance with the preferred embodiment including a system ROM and a non-volatile RAM that includes storage for a configuration extension table.
Figure 3:
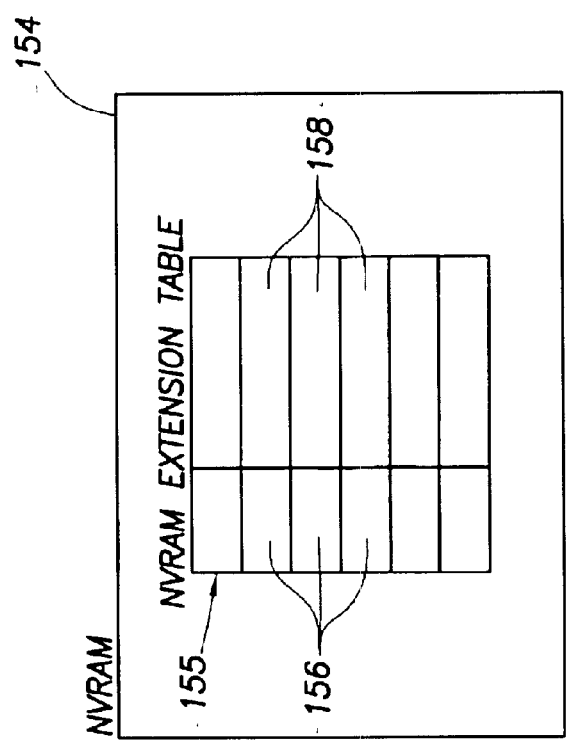
FIG. 3 shows the configuration extension table stored in the non-volatile RAM.

Referring now to FIG. 1, computer system 100 constructed in accordance with the preferred embodiment generally comprises a CPU 102 and system memory 106 coupled to a host bridge device 104, various peripheral devices 110 and 112 coupled to a bus 108, a second bridge device 114 coupled to a hard drive 116, and an advanced server management ("ASM") device 150 coupled to the bus 108. The computer system 100 also includes a read only memory ("ROM") 144 coupled to the bus 108 and a non-volatile random access memory ("NVRAM") 154 coupled to the ASM 150 and one or more serial shift registers 162 also connected to the ASM 150. Further, the computer system includes one or more slots 120 into which a peripheral card can be inserted if desired. The slots 120 couple to bridge device 114 by way of an industry standard architecture ("ISA") bus 122. A keyboard controller ("KBC") 123 interprets signals from keyboard 125.

In the preferred embodiment, CPU 102 preferably is any suitable type of microprocessor, such as a processor from the Pentium®, Celeron® or Itanium® line of processors. It should be understood, however, that any suitable type of microprocessor can be used.

The host bridge 104, which preferably is a 450NX Host Bridge manufactured by Intel or other suitable device, bridges together various devices such as CPU 102, system memory 106, and various devices connected to bus 108, such as devices 110, 112. The host bridge 104 provides interfaces (not specifically shown) to the various buses connected to the CPU, system memory, and bus 108 devices. In accordance with known techniques, host bridge 104 orchestrates the transfer of data and commands between devices coupled to it.

Bus 108 can be any suitable type of bus. In accordance with the preferred embodiment, bus 108 comprises a peripheral component interconnect ("PCI") bus. Various types of PCI-compliant devices can be included in computer system 100 and connected to PCI bus 108. For example, ROM 144 preferably connects PCI bus 108. Other examples shown in FIG. 1 include a network interface card ("NIC") 110 and a modem 112. Other PCI devices can be included as well if desired.

Bridge device 114 preferably is any suitable type of bridge device that can bridge together the PCI bus 108, an intelligent device electronics ("IDE") bus, and the ISA bus 122 (which alternatively can be an EISA bus) and, accordingly, is shown in FIG. 1 as a PCI-to-ISA/IDE bridge device. For example, the PIIX4E bridge device from Intel is suitable, but other devices can be used as well. A hard disk drive 116 couples to PCI-ISA/IDE bridge device 114 by way of the IDE bus. The ISA slots 120 preferably receive ISA-compatible peripheral cards which couple to PCI-ISA/IDE bridge 114 via the ISA bus 122. It should be understood by those of ordinary skill in the art that any of the buses shown in FIG. 1 can be replaced with other bus architectures, such as the universal serial bus ("USB") and IEEE 1394 bus, to name a few.

The ASM 150 provides various capabilities such as server management and interrupt control functions. At least one suitable ASM is described by one or more of the following U.S. patents all of which are incorporated herein by reference: U.S. Pat. Nos. 5,390,324, 5,596,711 and 5,956,476. Additionally, read from NVRAM 154. The ASM 150 also can receive a serial stream of data on its serial data ("SER DATA") input pin provided from one of the serial shift registers 162 at 171 as shown. Each shift register 162 preferably comprises an 8-bit shift register such as an LS165 which is available from various manufacturers. Each shift register can be loaded in parallel via input pins 166 upon the assertion of the serial load ("SI_LD") control signal from ASM 150. Each of the input pins 166 can be connected, for example, to any input/output device for which it is desirable to read status information.

Figure 2:
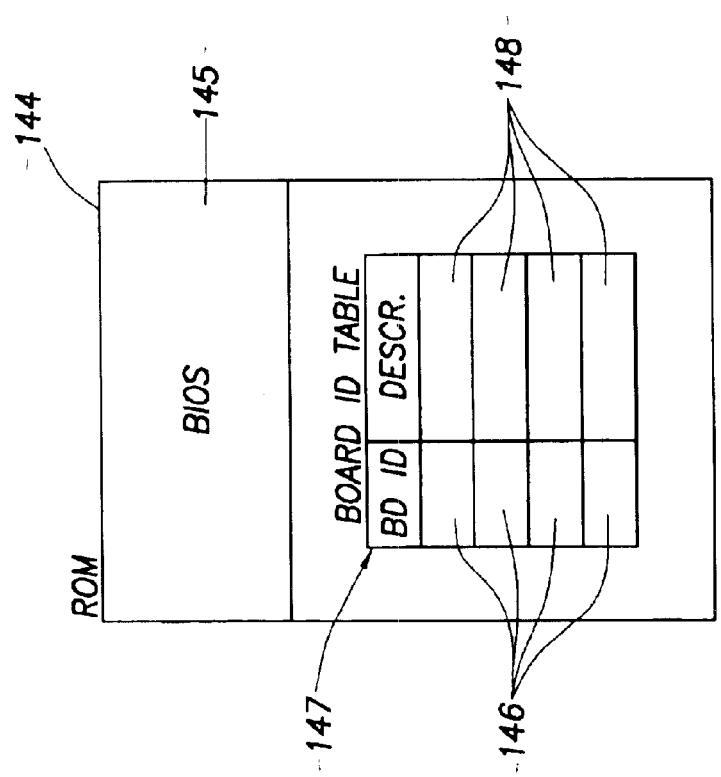
FIG. 2 shows the types of information stored in the ROM in greater detail including a board configuration table.

Referring now to FIG. 2, the ROM 144 preferably includes storage for the computer's basic input/output system ("BIOS") software 145 and a board identification ("ID") table 147. Other information can be stored in ROM 144 if desired. The BIOS software 145 is well known in the art and need not be explained in detail herein. The BIOS software generally provides low level routines to permit the computer's operating system to access various input and output devices.

The board ID table 145 preferably comprises one or more entries (the number of entries is not important to the invention). Each entry preferably includes a board ID 146 and corresponding information 148. The board IDs preferably uniquely identify the type of board. The board ID 146 may be, for example, a PCI board ID associated with NIC 110 that uniquely the particularly type of NIC used in the computer system 100. The corresponding information 148 preferably includes descriptive text that identifies helpful information such as the type of board (e.g. NIC, modem, etc.), the model number of the board, and various "environmental variables" such as the interrupt setting and port settings necessary for proper operation of the corresponding board. The computer 100 uses such environmental variables to configure and properly use the board. Such configuration preferably occurs during system initialization at which time a routine determines which boards are installed in the system and consults the board ID table 147 to determine the proper configuration for the boards. ROM-Based Set Up ("RBSU") is one such a routine.

As new boards become available, conventional computer systems would have required the ROM 144 to be flashed to update the board ID table 147 with the new board information. However, in accordance with the preferred embodiment of the invention, computer system 100 avoids having to reflash the ROM each time it is desired to update the board ID table.

Referring to FIG. 2, the NVRAM 154 preferably includes a board ID extension table 155. Board ID extension table 155 preferably includes storage for one or more entries in which each entry includes storage for board IDs 156 and corresponding information 158 similar to that of the board ID table 147 in the ROM 144. The size of the NVRAM 154 and, specifically, the size of the board ID extension table 155 can be any suitable size. For example, each entry 156, 158 in the table 155 would preferably have enough storage capacity for 80 characters to hold the board ID and the corresponding information. The total number of entries in the NVRAM-based table 155 preferably is 20 entries or less. If the table 155 has 20 entries and each entry has storage for 80 characters, then, assuming each character requires one byte of storage, the table 155 preferably occupies approximately 1600 bytes of NVRAM storage space.

The use of the preferred embodiment of the invention shown in FIGS. 1 and 2 will now be described. There are generally two parts to the technique of using the NVRAM 154. The first general step is to use any suitable program which will take a file of board IDs and descriptions and download them into the entries 156 and 158 in the board ID extension table 155. This step can be accomplished in any suitable manner such as by using a BIOS call to write the new board IDs and descriptions to table 155. The program by which the BIOS call or other technique is made can by any suitable DOS, Windows NT, Netware, Unix, etc. operating system. After rebooting the system 100, the new board IDs and descriptions in the board ID extension table 155 preferably will be available to the RBSU program.

The distribution of the updated board ID entries can be accomplished through any suitable mechanism such as by distribution over a wide area network such as the Internet or by mailing updates on floppy disks or CD ROMs to owners of the computer systems. Several suitable techniques include using the SmartStart or Softpaq mechanisms provided by Compaq Computer Corporation.

The second part to implementing the preferred embodiment of the invention is to use the entries in the board ID extension table 155 in NVRAM as extensions to entries in the ROM-based table 147. When the ROM-based setup utility program is run after adding the new entries to NVRAM table 155, the utility program will compare the board IDs detected for boards installed in the system 100 and check both tables 147 and 155 for a matching board ID. In accordance with the preferred embodiment of the invention, the utility program first checks the ROM-based board ID table 147. If the board ID is found in that table, the utility uses the corresponding board information to configure the board. If the board ID, however, is not found in the conventional ROM-based board table 147, the utility program will then check the NVRAM extension table 155 for a matching board ID entry. If the board ID is found in the NVRAM extension table 155, the utility uses the corresponding board information to configure the board. If the board ID, however, is not found in either the ROM-based or the NVRAM-based tables, the utility program will display a generic board device message on the computer's display (not specifically shown) and use a predetermined set of configuration settings that may be suitable for configuring unknown board types.

An advantage of the preferred embodiment described above is that as new boards become available to the user of a computer system, the ROM 144 need not be flashed with each ROM update. Instead, board entries are added to the NVRAM-based extension table. However, as ROMs are updated for other reasons, the entries in the NVRAM board ID extension table 155 can be added as permanent entries to the board ID table in the ROM 144. This is accomplished preferably with a software "filter" which guards against having unnecessary duplicate entries between the ROM-based table 147 and the NVRAM-based table 155. Duplicate entries might occur if the ROM image is updated and one or more board entries are added to the ROM image that also are in the NVRAM table 155. This filter preferably discards entries from the NVRAM table 155 that exist in the image to be flashed to the ROM-based table 147. Eliminating duplicate entries from the NVRAM extension table 155 facilitates maximum usage of the capacity of the NVRAM 154.

Additionally, the principles discussed above could be expanded for new configuration features altogether, apart from board configuration information. That is, the embodiment described above need not be limited to just board configuration setup information. Operating system support tables are another example of the data that could be updated using the technique described above. Typically, the type of operating system is stored in a ROM-based table. As additional operating systems become available, the ROM 154 typically need to be flashed to support the new operating systems. However, with the system described above, new operating system entries could be added to an NVRAM table thereby eliminating a ROM flash.

By not having to re-flash the ROM 144 in its entirety with new firmware, the computer system 100 need not be retested and the ROM's firmware revalidated. The testing and validation process can be very time consuming and this process is eliminated with the preferred embodiment of the invention described above. Because no other changes are made to the system, other than adding the new configuration information to the NVRAM 154, the system need not be re-tested.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
   a processor;
   a flashable ROM device coupled to said processor and containing a configuration table; and
   a non-volatile, non-flashable memory device coupled to said processor and containing an extension configuration table;
   wherein configuration character data can be added to the computer system by storing such configuration character data in the extension configuration table; and
   wherein, upon executing a set-up routine to permit a user to configure the computer system for a newly installed device, said processor examines the flashable ROM device to determine whether configuration character data pertaining to the newly installed device is present and, if not, said processor then examines the non-volatile, non-flashable memory device to determine whether the configuration character data pertaining to the newly installed device is present.

2. The computer system of claim 1 wherein said non-volatile, non-flashable memory device comprises a non-volatile RAM device.

3. The computer system of claim 1 wherein said configuration table and said extension configuration table include a plurality of entries with each entry including an option identifier and corresponding configuration character data.

4. The computer system of claim 3 wherein each option identifier and corresponding configuration character data pertain to a circuit board.

5. The computer system of claim 1 wherein said configuration table includes a plurality of entries with each entry including a board identifier and corresponding configuration character data.

6. The computer system of claim 5 wherein said extension configuration table includes storage capacity for a plurality of entries that include a board identifier and corresponding configuration character data.

7. A method of configuring a computer, comprising:
   adding a device to the computer;
   first searching a ROM memory in which configuration information is stored for the configuration information pertaining to the added device;

then, if the configuration is not found in the ROM memory, searching a non-volatile RAM memory for the configuration information;

flashing the ROM memory;

determining whether any entries on the ROM memory duplicate entries in the nonvolatile RAM memory; and if one or more duplicates are found, clearing the one or more duplicate entries from the non-volatile RAM memory.

8. The method of claim 7 wherein the configuration information includes circuit board identifiers and corresponding configuration data.

9. The method of claim 7 wherein the configuration information includes operating system data.

10. The method of claim 7 further including storing configuration information in said non-volatile RAM memory instead of in the ROM memory when said device is added to the computer.

11. A method of flashing a ROM containing configuration information with a new set of configuration information in a computer system also including an NVRAM which contains an extension table having storage for configuration information, wherein new configuration is added to the NVRAM extension table instead of the ROM, said method comprising:

comparing entries in the new set of configuration information to be stored in the ROM against entries in the extension table in the NVRAM;

if a matching pair of entries is found, deleting the corresponding entry from the NVRAM; and storing the new set of configuration information in the ROM.

12. The method of claim 11 wherein the configuration information comprises board identifiers and corresponding configuration data.

* * * * *